US007653816B2

(12) United States Patent
Avritch et al.

(10) Patent No.: US 7,653,816 B2
(45) Date of Patent: Jan. 26, 2010

(54) E-MAIL CERTIFICATION SERVICE

(75) Inventors: Peter S. Avritch, Oak Park, CA (US);
Bruce M. Clay, Moorpark, CA (US);
James R. Du Molin, Tiburon, CA (US)

(73) Assignee: First Information Systems, LLC,
Tiburon, CA (US)

( * ) Notice: Subject to any disclaimer, the term of this patent is extended or adjusted under 35 U.S.C. 154(b) by 756 days.

(21) Appl. No.: 10/749,911

(22) Filed: Dec. 30, 2003

(65) Prior Publication Data
US 2005/0188020 A1 Aug. 25, 2005

(51) Int. Cl.
H04L 9/32 (2006.01)
(52) U.S. Cl. ...................................... 713/176
(58) Field of Classification Search .................. 713/176
See application file for complete search history.

(56) References Cited

U.S. PATENT DOCUMENTS

| 5,619,648 | A | | 4/1997 | Canale et al. |
| 5,877,757 | A | * | 3/1999 | Baldwin et al. ............. 715/705 |
| 5,926,552 | A | * | 7/1999 | McKeon ...................... 380/51 |
| 5,944,787 | A | * | 8/1999 | Zoken ......................... 709/206 |
| 5,999,967 | A | | 12/1999 | Sundsted |
| 6,112,227 | A | * | 8/2000 | Heiner ........................ 709/203 |
| 6,192,130 | B1 | | 2/2001 | Otway |
| 6,356,937 | B1 | * | 3/2002 | Montville et al. ........... 709/206 |
| 6,775,382 | B1 | | 8/2004 | Al-Salqan |
| 2001/0037453 | A1 | | 11/2001 | Mitty et al. |
| 2002/0046286 | A1 | * | 4/2002 | Caldwell et al. ............. 709/229 |
| 2002/0052921 | A1 | * | 5/2002 | Morkel ........................ 709/206 |
| 2002/0059144 | A1 | | 5/2002 | Meffert et al. |
| 2002/0076053 | A1 | * | 6/2002 | Hachimura .................. 380/277 |
| 2002/0132607 | A1 | * | 9/2002 | Castell et al. ................ 455/412 |
| 2002/0144122 | A1 | | 10/2002 | Haughan et al. |
| 2002/0172367 | A1 | * | 11/2002 | Mulder et al. ............... 380/277 |
| 2003/0147536 | A1 | | 8/2003 | Andivahis et al. |
| 2004/0139163 | A1 | * | 7/2004 | Adams et al. ................ 709/206 |
| 2005/0193075 | A1 | | 9/2005 | Haff et al. |

OTHER PUBLICATIONS

International Search Report and Written Opinion in corresponding PCT Application No. PCT/USO4/43874, Jul. 10, 2006.

(Continued)

Primary Examiner—Gilberto Barron, Jr.
Assistant Examiner—Cordelia Kane
(74) Attorney, Agent, or Firm—Beyer Law Group LLP

(57) ABSTRACT

A method is provided to handle an electronic mail message such that the receiver of the e-mail message can verify the integrity of the message. A request is provided from a sender's side to a service. The request includes information regarding the e-mail message. The service processes at least a portion of the request to generate a result. For example, the service may encrypt the portion of the request, according to a public/private key encryption scheme, to generate a digital signature as the result. The service provides the result to the sender's side. At the sender's side, the result is incorporated into the e-mail message and the result-incorporated message is transmitted via an e-mail system. At the receiver's side, the result-incorporated e-mail message is processed to assess the integrity of the received e-mail message.

43 Claims, 3 Drawing Sheets

OTHER PUBLICATIONS

Author Unknown. "About Self-Destructing-Email,". (unknown). Located at < http://www.self-destructing-email.com/self-destructing-email/about.asp> last visited on Jan. 13, 2004. (4 pages).

Accurate Automation Corporation . Auto-Notary™. (Date Unknown),."A Technique for Authentication of Digital Information," (2 pages).

Author Unknown. "Self-Destructing Email FAQ- Questions and Answers," located at <http://www.self-destructing-email.com/self-destructing-email/faq.asp> last visited on Jan. 13, 2004. (10 pages).

Weinstein, L. co-founder, (2003). "Tripoli An Empower E-mailed Environment: Putting E-Mail Users in Control While Enhancing Security and Controlling Spam," Tripoli Project Press Release located at <http://www.pfir.org/tripoli-overview> last visited on Aug. 26, 2003. (6 pages).

Schneier, Bruce, "Applied Cryptography, Second Edition: Protocols, Algorithms, and Source Code in C," Wiley Computer Publishing, John Wiley & Sons, Inc. 1996, Cover, Table of Contents, and Chapters 2, 10 and 19, pp. 21-46, 213-229, and 461-482.

* cited by examiner

E-MAIL CERTIFICATION SERVICE

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

The present invention is in the field of electronic mail and, more particularly, is directed to verification, by a receiver of an e-mail message, of the integrity of the received e-mail message.

Electronic mail has become a useful tool in our personal and business lives. Unfortunately, like other useful technologies, it has also become an intrusion. For example, only the most diligent among us are able to avoid scurrilous attempts to sell us nutritional supplements, mortgages, pornography and numerous other "products." More recently, scammers have taken to using "spoof" e-mails in an illegitimate attempt to gain access to our personal information. For example, such scammers have spoofed BestBuy and eBay, attempting to entice unsuspecting users into providing personal information such as social security numbers and credit card numbers. Thus, as useful as e-mail has proven to be in our lives, it can be dangerous to blindly assume that received e-mail is legitimate. However, efforts at minimizing intrusion of technologies often unavoidably diminish the usefulness of the technology whose intrusion we are seeking to minimize.

For example, "spam" catchers typically catch legitimate e-mail messages in addition to spam e-mail messages. Users must carefully scrutinize the caught e-mail messages, lest any of them be legitimate and unintentionally ignored. Also, spoof e-mail messages are more difficult to detect, as they appear in many respects to be legitimate.

There have been a number of attempts to address the concerns with e-mail. One notorious attempt is described in U.S. Pat. No. 5,999,967, to Sundsted. Sundsted has proposed attaching an "electronic stamp" to each e-mail message sent, where the receiver of the e-mail message receives money from the sender. The receiver can determine whether it is "worth it" (from the value of the attached stamp) to read the e-mail and receive the money. Because Sundsted employs "stamps" having monetary value associated with them, there is a practical requirement (which is difficult to achieve) that the system to exchange value be secured against fraud. Furthermore, even if the system to exchange value can be made secure, there is nothing that allows a receiver of e-mail to discriminate between senders from whom it is desirable to receive e-mail and senders from who it is undesirable to receive e-mail apart from the monetary benefit to the receiver who reads e-mail. Perhaps even more significantly, nothing in the electronic stamp allows one to assess the integrity of the e-mail.

In many respects, a proposed system known as "Hash-Cash" is similar to the system described in the Sundsted disclosure. The proposed HashCash system is such that, before an e-mail message is sent, a significant particular math computation must be performed on the sending computer to generate a token. This computation is such that, for example, it would take up to 15 seconds on a standard 1 GHz PC. The token is incorporated into the e-mail message. The receiving computer performs a relatively simple computation to verify that the token is, in fact, the result of the particular a math computation performed on the sending computer. A drawback of HashCash, then, is that anyone who is willing to undergo the computational burden can send e-mail messages unimpeded. That is, like the system described in the Sundsted patent, there is nothing in the token that allows the receiving side to discriminate between senders from whom it is desirable to receive e-mail and senders from whom it is undesirable to receive e-mail, beyond verifying that the sender did, in fact, incur the computational expense to generate the Hash-Cash token. That is, in some sense, HashCash merely substitutes computational expense for the monetary expense of the Sundsted system (albeit there is money or other value received by the e-mail recipient).

BRIEF SUMMARY OF THE INVENTION

A method is provided to handle an electronic mail message such that the receiver of the e-mail message can verify the integrity of the message. A request is provided from a sender's side to a service. The request includes information regarding the e-mail message. The service processes at least a portion of the request to generate a result. For example, the service may encrypt the portion of the request, according to a public/private key encryption scheme, to generate a digital signature as the result. The service provides the result to the sender's side.

At the sender's side, the result is incorporated into the e-mail message and the result-incorporated message is transmitted via an e-mail system. At the receiver's side, the result-incorporated e-mail message is processed to assess the integrity of the received e-mail message.

DETAILED DESCRIPTION OF THE INVENTION

Figure 1:
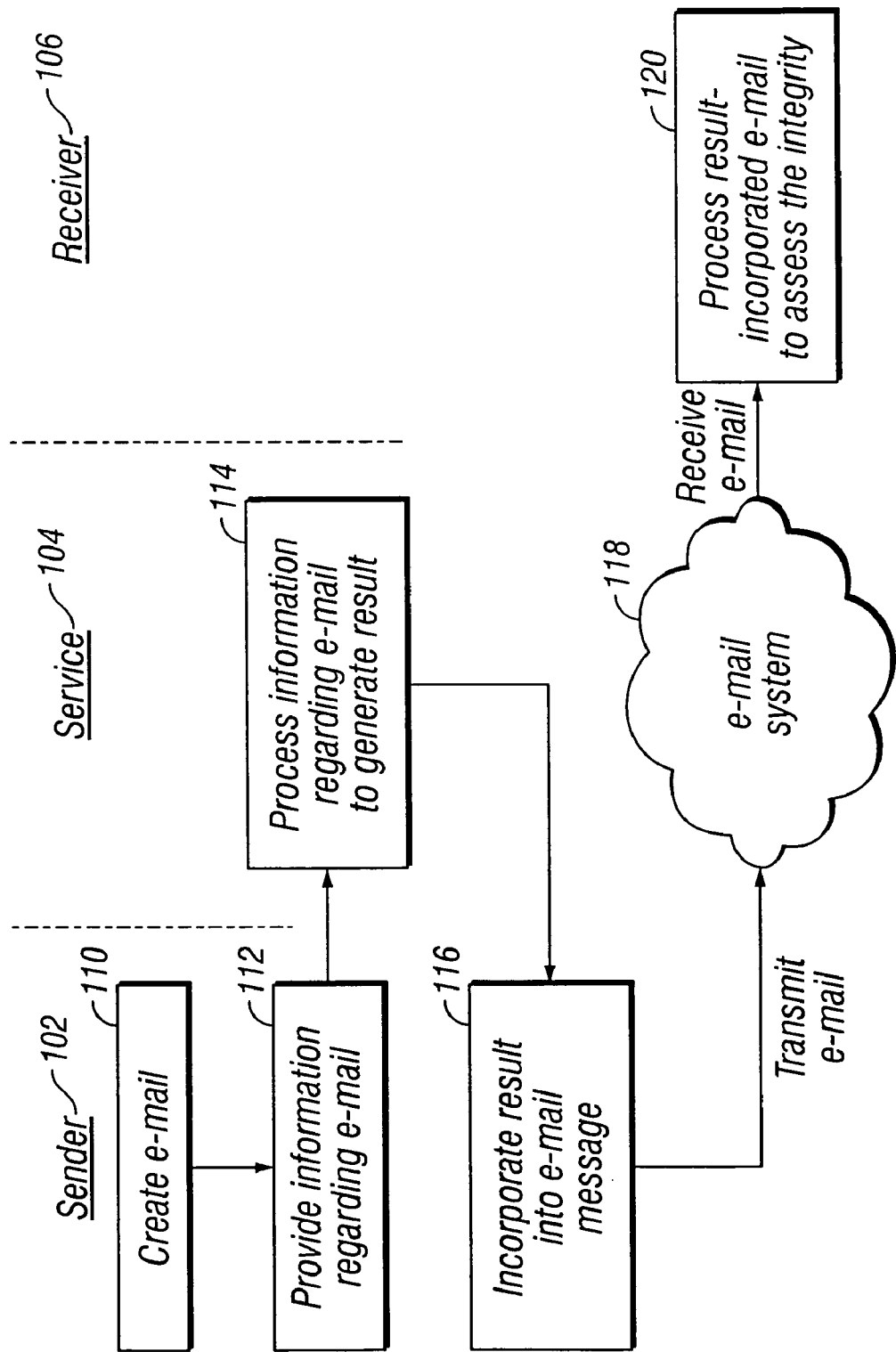
FIG. 1 is a flowchart illustrating a process in accordance with an aspect of the invention.
Figure 2:
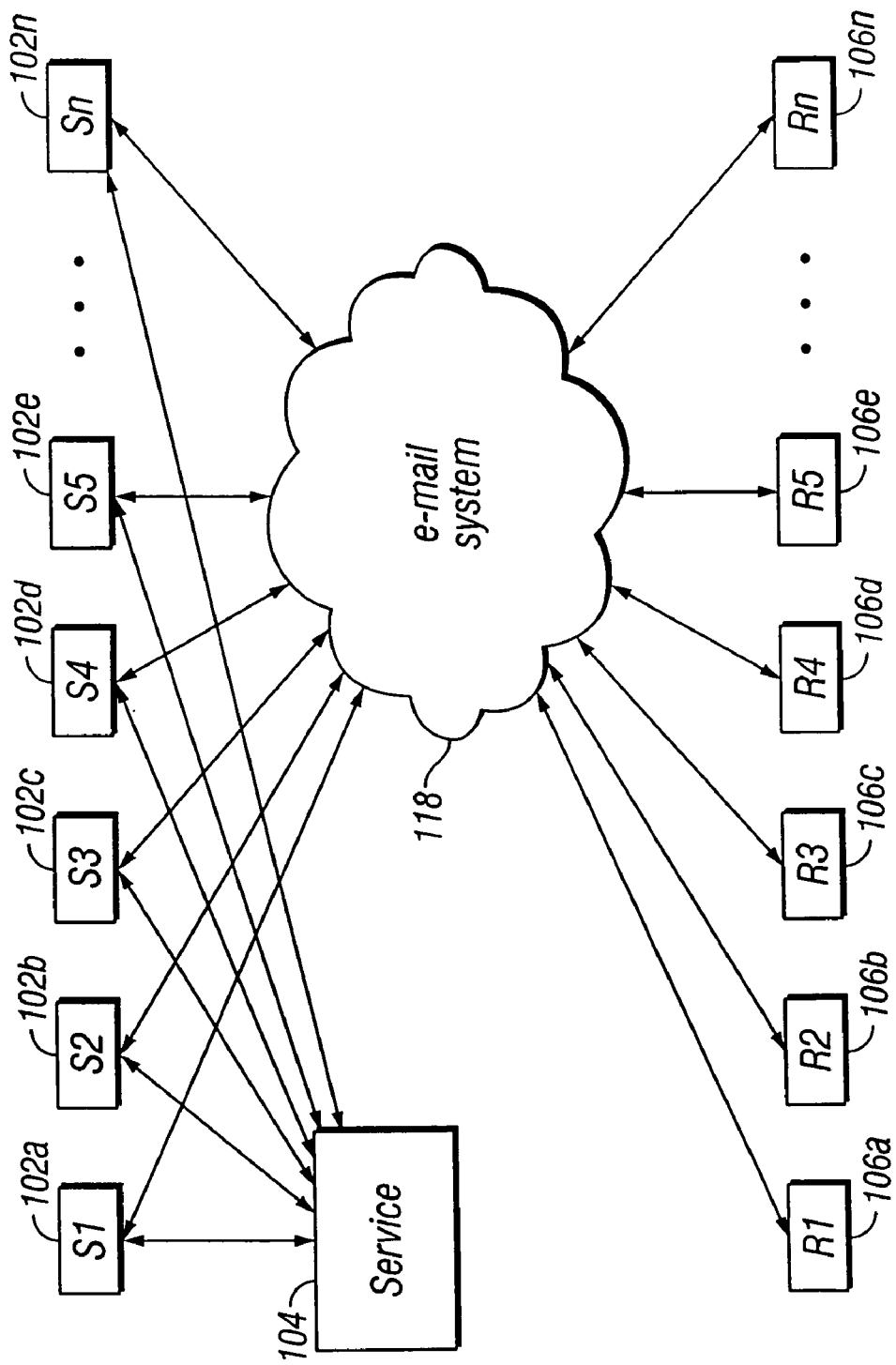
FIG. 2 schematically illustrates the relationship between various entities as the FIG. 1 method is executed.

FIG. 1 illustrates a broad aspect of a method/system to handle an e-mail message such that a receiver of the e-mail message can assess the integrity of the e-mail message. FIG. 2 illustrates the architecture of the method/system. Referring to FIGS. 1 and 2, a plurality of senders 102a through 102n (referred to generically in FIG. 1 by the reference numeral 102) and a plurality of receivers 106a through 106n (referred to generically in FIG. 1 by the reference numeral 106) are, in a basic form, present in any e-mail system. That is, any sender 102 can send an e-mail message to any receiver 106 via the e-mail system 118.

Referring specifically to FIG. 1, at step 110, an e-mail is created at the sender's side. For example, the user authors an original e-mail message using standard e-mail client software (e.g., Outlook 98 or Outlook 2000), including indicating a desired recipient of the message. At step 112, information regarding the e-mail is provided to the service 104. The user does not need to take any special course of action to cause the information to be provided to the service 104. The process is intentionally "transparent" to the user to eliminate any possible confusion and extra steps that might otherwise interfere with the rapid deployment and use of the service 104.

For example, upon detecting an e-mail message to be sent, programming code either embedded within the email client or included as an add-on component intercepts the e-mail message. The mail client interacts with the service 104, in the form of a single TCP/IP request using a standard Internet protocol such as HTTP or HTTPS. By using standard Internet protocols communication with the service 104, packets of the communication will generally not be blocked by corporate or home DSL firewalls. Packets transmitted by HTTPS are also generally immune from network snooping since HTTPS is a secure protocol. It is noted that payload data of HTTP transmissions may be internally encrypted.

In one example, the information regarding the e-mail message, provided to the service 104, includes the following information:
  Sender's email address
  Recipient's email address
  Digest of message body (mathematical hash of the email text)

In general, the information regarding the e-mail message includes information such that, after being processed by the service 104 to generate a result, as discussed below, the receiver's side 106 can process the result and assess the integrity of the e-mail message.

In some embodiments, the information provided to the service 104 includes the sender's identity and authentication (typically account/password). This information, as opposed to being information regarding the e-mail message, can be characterized as information about the sender, from which the service 104 can authenticate the sender.

It is not necessary for the sender's side 102 to provide the actual content (body) of the e-mail message to the service 104. This contributes to maintaining the privacy, security and comfort of the sending user. The e-mail message body is "hashed" by the mail client at the sender's side 102 to derive a multi-digit numerical sequence which represents the substance of the message without disclosing its content. The hash result, more commonly known as a message digest, is a mathematically unique number generated according to the industry standard SHA-1 algorithm. The theory of SHA-1 is that it will never generate the same message digest for non-identical input text, yet it will always generate the same digest for the identical input text. Message digests are most commonly used in security schemes utilizing RSA encryption systems and have been accepted by industry for many years as a very dependable form of representing messages and for detecting unauthorized changes to such messages. It is the message digest, not the substance of the message itself, that is the information regarding the e-mail message provided from the sender's side 102 to the service 104.

Referring still to FIG. 1, at step 114, the service 104 processes the information regarding the e-mail to generate a result. In particular, the information regarding the e-mail is routed, using load-balancing techniques, to an appropriate HTTP server of the service 104. A goal of load balancing is to reduce load or bottlenecks and minimize risk due to system failures. Off-the-shelf hardware contributes to this. Also, senders may be "assigned" to particular groups, and the groups may be assigned to sets of servers. In this instance, each sender will locally save the URL/IP for its associated group and, thus, will be able to help avoid traffic jams by going directly to a server that is able to handle its requests. This load can be spread around the country/world so the "whole universe" is not potentially trying to simultaneously hit one single access point. Downtime is improved since, if a server does go down, only its assigned group is affected.

The service 104 executes a program to authenticate the account name and password. In addition, the sender's e-mail address, recipient's e-mail address and message body digest are combined (e.g., concatenated) along with additional housekeeping information (timestamp, sequence numbers, priority, sorting, keywords, etc.) and provided as input to the industry-standard SHA-1 algorithm, to form a 160-bit unique result. In some embodiments, a portion of the 160-bit unique result is discarded in order to increase performance and reduce the size of the result without meaningfully degrading the ability of the receiving side 106 to adequately assess the integrity of the e-mail message.

Still at step 114, the service 104 signs the result (entire, or a portion thereof as discussed above) of the SHA-1 algorithm with a private key, such that it can be decoded using the corresponding public key. The private key is kept secret by the service 104, and the public key is made available to the receiver side 106. In some embodiments, the public key is "embedded" within the receiver side e-mail client software. The signing determines a sequence result that is an alphanumeric sequence of characters approximately 128 characters long. The service-determined sequence result is returned from the service 104 to the requesting sender 102. In some embodiments, a corresponding result code is also provided to the sender 102.

Further, in some embodiments, the service 104 performs a variety of accounting, logging and account management procedures at step 114 so that usage and quality of service can be monitored and so that, for example, billing functions can be executed as appropriate.

At step 116, the sender 102 incorporates the service-determined sequence result into the e-mail message. In one embodiment, the service-determined sequence result is incorporated into the e-mail as an SMTP mail header. Mail headers are commonly used within existing SMTP systems, and such systems include processes to perform the routing and housekeeping out of view of the users such that e-mail messages ultimately arrive in the inbox of their intended recipients. Industry-standard guidelines cover the use of such mail headers, so e-mail messages including the mail headers are allowed to pass through the existing SMTP infrastructure without being blocked, without interfering with the quality of service delivered to users, and without being altered.

Turning back to FIGS. 1 and 2, the result-incorporated e-mail message is then transmitted via the e-mail system 118 to the sender's SMTP server, and, ultimately is forwarded to the designated recipient's POP3 email account. SMTP routing software along the way is free to either ignore or interpret the SMTP mail header holding the service-determined sequence result. Generally, the SMTP mail header will be ignored (with the exception of the SMTP server or e-mail client of the intended recipient).

The e-mail client software of some intended recipients may not be "enabled" (either does not have the capability or is not so configured) to process the SMTP mail header holding the service-determined sequence result. The sender need not know (or care) if the recipient is using enabled e-mail client software. If the e-mail client software of the receiver is enabled, the SMTP mail header holding the service-determined result will be processed. Otherwise, non-enabled receiver clients ignore the SMTP mail header, generally behaving as if the SMTP mail header was not included in the received e-mail message at all.

If the e-mail client software of the recipient is enabled, at the receiver side 106, the sequence result is processed at step 120 to assess the integrity of the received e-mail. The e-mail message is received "normally" by the email client software from the recipient's SMTP/POP3 server. Before presenting the incoming e-mail message to the user, the e-mail message is preprocessed to assess the integrity of the received e-mail message. This may be accomplished by validation code that is, for example, embedded into the e-mail client; a third-party add-on component to the email client; integrated into an embedded or third-party anti-SPAM product; integrated in whole or in part, or as an add-on, within an advanced SMTP server such as Microsoft's Exchange Server.

Figure 3:
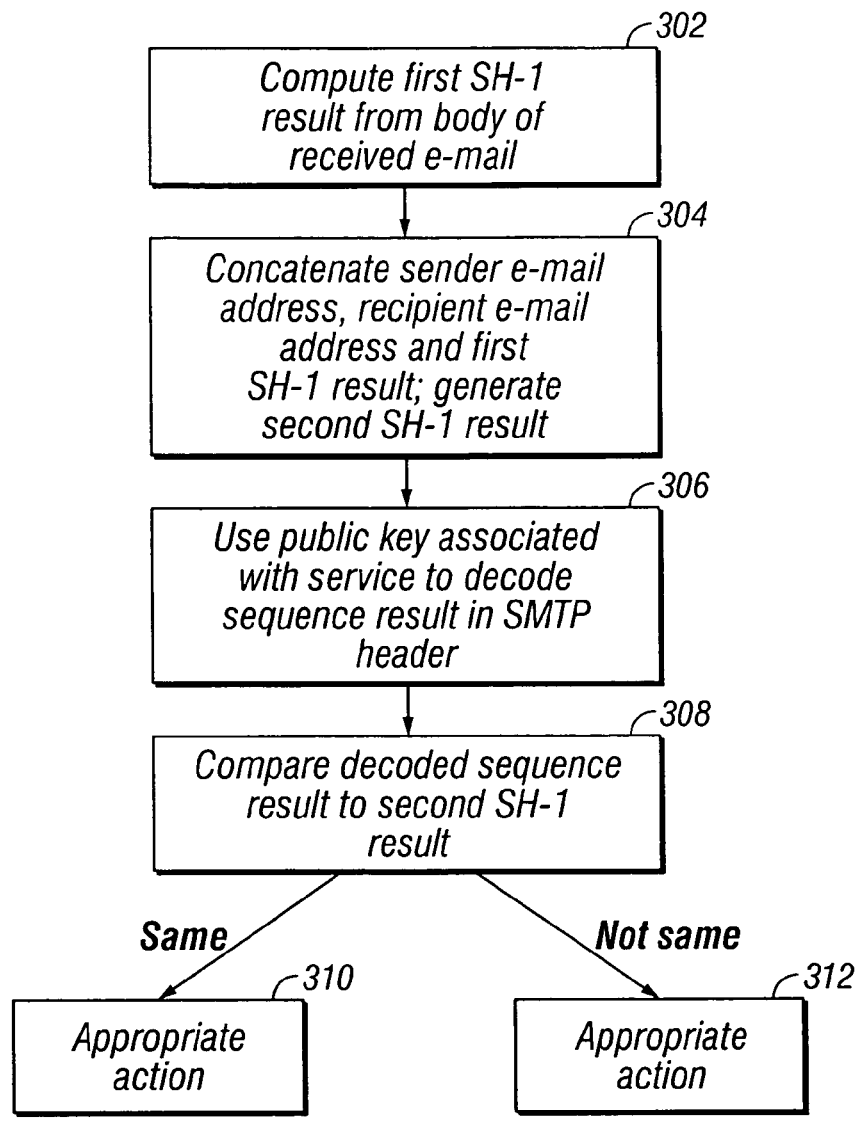
FIG. 3 is a flowchart illustrating, in greater detail, a portion of the FIG. 1 method that is executed at the receiver's side.

FIG. 3 illustrates, in greater detail, processing of step 120 at the receiver side 106. Turning now to FIG. 3, upon interception of the incoming message, at step 302, the validation code generates a first SH-1 result, based on the body of the received e-mail (the part the user generally sees). If the body of the received e-mail has not changed since being composed by the sender 102 (more properly, since the message digest was created at step 112 of FIG. 1), then the SH-1 result, computed at the receiver's side 106 in step 302, will be the same as the digest computed at the sender's side 102 and provided to the service 104 at step 112.

At step 304, the first SH-1 result is concatenated with the sender's and recipient's e-mail addresses as contained in the received e-mail. This concatenation is the basis of a second SH-1 result generated at step 304. The second SH-1 result nominally replicates the service-determined result (step 114 of FIG. 1) computed by the service 104 and incorporated into the e-mail message at the sender's side 102 (step 116 of FIG. 1).

Also at step 306, the public key associated with the service 104 is used to decode the service-determined result incorporated into the received e-mail message, to determine a decoded service-determined result. If there has not been spoofing or hacking or other alteration of the e-mail message (whether willful or otherwise), the decoded service-determined result matches the second SH-1 result. Once the integrity of the received e-mail has been assessed, appropriate action is taken. At step 4308, the decoded service-determined result is compared to the second SH-1 result. If these are the same, then the received e-mail is "sound" and appropriate action is taken at step 310. If these are not the same, then the received e-mail is not "sound" and appropriate action is taken at step 312.

In accordance with some embodiments, at the receiver's side 106, it is determined whether a received e-mail message is identical to e-mail messages previously received. This is typically a result of an identical e-mail message being sent to the recipient repeatedly. Specifically, a cache is maintained at the receiver's side 106 of service-determined results. By comparing the service-determined result associated with a received e-mail message to entries in the cache, it can be determined that the received e-mail message is identical to one or more e-mail messages previously received, and appropriate action can be taken.

In accordance with some embodiments, in addition to the service-determined result, the SMTP message header includes additional information provided at the sender side 102. For example, this additional information may include keywords, which can be used by the e-mail client software at the receiver's side 106. This additional information can be processed and appropriate action taken. For example, the e-mail client software at the receiver's side 106 may use the information for sorting of e-mail messages or for otherwise controlling the placement of e-mail messages in the e-mail inbox.

Figure 4:
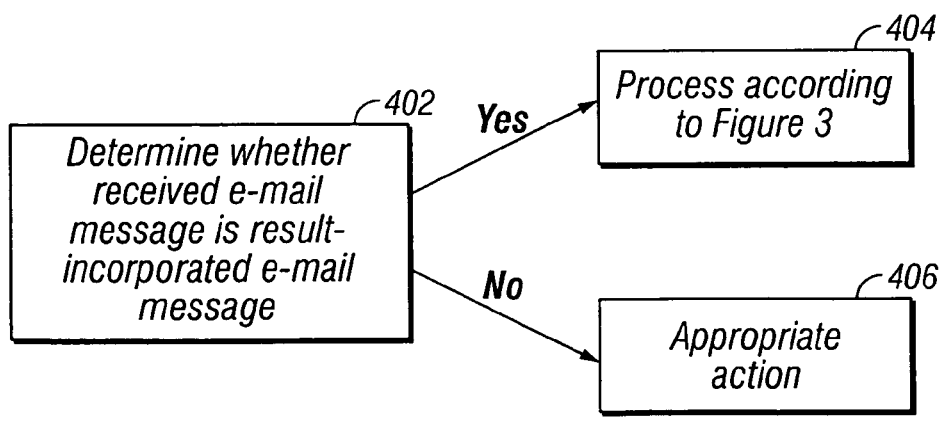
FIG. 4 illustrates a portion of the FIG. 3 method where it is determined if a received e-mail message is a result-incorporated message and appropriate action is taken.

Referring to FIG. 4, it is recognized that some received e-mail messages will not be result-incorporated e-mail messages. At step 402, it is determined whether the received e-mail message is a result-incorporated e-mail message. This may be accomplished, for example, by checking for the appropriate SMTP header where the result would be expected to have been incorporated into the e-mail message. If the e-mail message is a result incorporated e-mail message then, at step 404, processing takes place according to FIG. 3. Otherwise, at step 406, appropriate action is taken. For example, preference may be to consider such unverifiable e-mail messages to be of a low priority.

We now discuss how senders 102 may initially "register" with the service 104. Generally, before the service 104 will transmit a result to the sender's side 102, it must receiving an indication of agreement by the sender to terms of use of the service. The indication of agreement to terms of use of the service 104 may be as a result of an initial subscription by the sender 102 to the service. The sender's side is nominally associated with a particular e-mail address of a plurality of e-mail addresses. At the service, before transmitting the result to the sender's side, an inquiry e-mail message may be sent to the particular e-mail address, and the service may observe behavior of the sender associated with the inquiry e-mail message. For example, the expected behavior of the sender associated with the inquiry e-mail message may include the sender sending an e-mail message to the service in reply to the inquiry e-mail message. Additionally or alternately, the behavior of the sender associated with the inquiry e-mail message may include following instructions set forth in the inquiry e-mail message, such as instructions to link to a particular universal resource locator. The inquiry message may be sent by a transmission channel other than the electronic mail system. For example, the transmission channel may include a hardcopy delivery service, such as a mail service or similar courier service, and may even require signature of the sender.

In some embodiments of the e-mail client (at the receiver's side 106) or included add-on component that intercepts the e-mail message, facility is provided for the receiving users to use data from the database of sender information associated with the service 104. For example, a button may be provided on the e-mail client of the receiver that can be activated by the receiver while viewing/selecting a result-incorporated message. As a result of activating the button, a query is sent to the sender information database for information on the sender. The sender information is available for display to the recipient. The information could be provided for display in text or rich formats, for example, including XML, HTML, etc. The information could even include, for example, a photograph of the sender if the photo was provided to the service 104.

As another example, a facility (such as a one-click import button) may be provided to add the sender to the contact list associated with the recipient's e-mail client software (since details about the sender like name, address, phone, e-mail addresses, etc. are included in the sender information database). Support may be provided in a format appropriate to the e-mail client, such as vcards and or the richer format supported by Outlook. (It is noted that Outlook 2003 has photo support). Links may be even be provided to web sites. As an example of the usefulness of such a facility, a real estate agent may send an email to a local prospect, and the prospect could have confidence as to the integrity of the information about the real estate agent, as provided from the sender information database. This can be a selling point for that real estate agent over other real estate agents whose information is not available from a trusted source.

While the present invention has been particularly described with respect to the illustrated embodiments, it will be appreciated that various alterations, modifications and adaptations may be based on the present disclosure, and are intended to be within the scope of the present invention. While the invention has been described in connection with what are presently considered to be the most practical and preferred embodiments, it is to be understood that the present invention is not limited to the disclosed embodiment but, on the contrary, is intended to cover various modifications and equivalent arrangements included within the scope of the claims.

What is claimed as new and desired to be protected by Letters Patent of the United States is:

1. A method of handling an electronic mail ("e-mail") message, comprising:
   a) at a sender's side, providing to a service, via a network, a request comprising meta-data information regarding the e-mail message, wherein the meta-data information includes at least an e-mail address of the sender and an e-mail address of a receiver of the e-mail message;
   b) at the service,
      b1) receiving the request off the network and processing at least a portion of the request to determine a result using a service private key, the service private key kept secret by the service; and
      b2) providing the result, from the service via the network, to the sender's side;
   c) at the sender's side,
      c1) incorporating the result into the e-mail message, and
      c2) transmitting the result-incorporated e-mail message via an e-mail system;
   d) at the receiver's side,
      d1) receiving an e-mail message which is the result-incorporated e-mail message;
      d2) processing the received result-incorporated e-mail message using a service public key to assess the integrity of the e-mail message.

2. The method of claim 1, wherein:
the step of processing at least a portion of the request to determine a result includes generating a digital signature based on the portion of the request and processing the digital signature with the service private key;
the result includes the processed digital signature; and
the step of processing the received result-incorporated e-mail message includes processing the digital signature using the service public key.

3. The method of claim 1, further comprising:
determining whether the e-mail message which is the result-incorporated e-mail message is actually a result-incorporated e-mail message;
if the e-mail message is not actually a result-incorporated e-mail message, performing a first particular action.

4. The method of claim 1, further comprising:
performing a particular action based on an outcome of assessing the integrity of the e-mail message.

5. The method of claim 4, wherein:
the particular action includes displaying an indication of the outcome of assessing the integrity of the e-mail message.

6. The method of claim 4, wherein:
the particular action includes organizing an e-mail inbox associated with the receiver based on the determination.

7. The method of claim 1, wherein:
the result includes an indication of a level of certification; and
the step of processing the received result-incorporated e-mail message to assess the integrity of the e-mail message includes processing the result to determine the level of certification.

8. The method of claim 7, further comprising:
at the receiver's side, filtering the e-mail message based on the determined level of certification.

9. The method of claim 1, wherein:
the request further comprises sender verification information; and the method further comprises
   at the service, processing the sender verification information.

10. The method of claim 1, wherein: the request includes a digest of the message body.

11. The method of claim 10, wherein:
the request does not include the message body or information from which the message body can be derived.

12. The method of claim 10, wherein:
the digest of the message is generated, at the sender's side, using an SHA algorithm.

13. The method of claim 10, wherein:
the step of processing the received result-incorporated e-mail message to assess the integrity of the e-mail message includes:
deriving the portion of the request from which the result was determined;
processing the portion of the request and the received e-mail message to assess the integrity of the e-mail message.

14. The method of claim 13, wherein:
deriving the portion of the request from which the result was determined includes processing the result using the service public key to generate a decrypted result;
processing the portion of the request and the received e-mail message to assess the integrity of the e-mail message includes
generating a digest of the message body and processing the generated digest and the decrypted result to assess the integrity of the e-mail message.

15. The method of claim 1, wherein:
at the sender's side, the result is incorporated into the message by including the result in a header associated with the message.

16. The method of claim 15, wherein:
the message is formatted according to an SMTP; and
the header associated with the message is an SMTP header.

17. The method of claim 1, wherein:
a sender is associated with the sender's side; and the method further comprises:
at the service, associating a physical location with the sender.

18. The method of claim 1, wherein:
a sender is associated with the sender's side; and the method further comprises:
at the service, determining how the sender may be later located.

19. The method of claim 18, wherein:
determining how the sender may be later located includes associating a degree of certainty with the determination.

20. The method of claim 19, wherein:
the result includes an indication of the degree of certainty.

21. The method of claim 1, further comprising:
at the service, before transmitting the result to the sender's side, receiving from the sender an indication of agreement to terms of use of the service.

22. The method of claim 21, wherein:
the indication of agreement to terms of use of the service received from the sender as part of an initial subscription by the sender to the service.

23. The method of claim 1, wherein:
the sender's side is associated with a particular e-mail address of a plurality of e-mail addresses; and
the method further comprises:
- at the service, before transmitting the result via the network to the sender's side, sending an inquiry e-mail message to the particular e-mail address; and
- at the service, observing behavior of the sender associated with the inquiry e-mail message.

24. The method of claim 23, wherein:
the behavior of the sender associated with the inquiry e-mail message includes the sender sending an e-mail message to the service in reply to the inquiry e-mail message.

25. The method of claim 23, wherein:
the behavior of the sender associated with the inquiry e-mail message includes following instructions set forth in the inquiry e-mail message.

26. The method of claim 25, wherein:
the instructions include instruction to link to a particular universal resource locator.

27. The method of claim 1, further comprising:
at the service, before transmitting to the sender's side the result, receiving a request for the sender to subscribe to the service;
at the service, sending an inquiry message to a sender associated with the sender's side, by a transmission channel other than the electronic mail system; and
at the service, observing behavior associated with the inquiry message.

28. The method of claim 27, wherein:
the transmission channel includes a hardcopy delivery service.

29. The method of claim 28, wherein:
the hardcopy delivery service includes a mail service or similar courier service.

30. The method of claim 29, wherein:
the mail service or similar courier service requires signature of the sender.

31. The method of claim 1, wherein:
the portion of the request includes an indication of an e-mail address associated with the sender, an indication of an e-mail address associated with the recipient, and a digest of a body of the e-mail message.

32. The method of claim 1, wherein:
at the receiver's side, processing the received result-incorporated e-mail message to assess the integrity of the e-mail message is without interacting with the service.

33. The method of claim 1, further comprising:
at the service, processing at least a portion of the request to generate a secondary result; and
providing an indication of the secondary result to the sender's side.

34. The method of claim 33, further comprising:
at the sender's side, performing a particular action based on the secondary result.

35. The method of claim 33, wherein:
the indication of the secondary result is an indication that the email message was generated as the result of a virus.

36. The method of claim 34, wherein:
the particular action includes not determining the result.

37. The method of claim 34, wherein:
the particular action includes not providing the result to the sender's side.

38. The method of claim 1, further comprising:
at the service, for a plurality of e-mails provided from the sender's side, determining a collective characteristic of the plurality of e-mails.

39. The method of claim 38, further comprising:
at the service, performing a particular action based on the determined collective characteristic.

40. The method of claim 39, wherein:
the particular action performed at the service based on the determined collective characteristic includes not providing the result.

41. The method of claim 1, further comprising:
sending a request from the receiver's side to obtain contact information about the sender from the service; and
at the service, providing the requested contact information about the sender to the receiver's side.

42. The method of claim 41, wherein:
the requested contact information about the sender provided from the service to the receiver's side is in a format appropriate to an e-mail client program used by the receiver's side.

43. The method of claim 41, wherein:
the requested contact information includes at least one link to sender advertising.

* * * * *

UNITED STATES PATENT AND TRADEMARK OFFICE
CERTIFICATE OF CORRECTION

PATENT NO. : 7,653,816 B2  
APPLICATION NO. : 10/749911  
DATED : January 26, 2010  
INVENTOR(S) : Avritch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 968 days.

Signed and Sealed this

Twenty-third Day of November, 2010

David J. Kappos  
*Director of the United States Patent and Trademark Office*